(12) United States Patent
Boehm (10) Patent No.: US 7,099,812 B2
(45) Date of Patent: Aug. 29, 2006

(54) GRID THAT TRACKS THE OCCURRENCE OF A N-DIMENSIONAL MATRIX OF COMBINATORIAL EVENTS IN A SIMULATION USING A LINEAR INDEX

(75) Inventor: Fritz A. Boehm, Austin, TX (US)

(73) Assignee: Intrinsity, Inc., Austin, TX (US)

(*) Notice: Subject to any disclaimer, the term of this patent is extended or adjusted under 35 U.S.C. 154(b) by 854 days.

(21) Appl. No.: 09/966,049

(22) Filed: Sep. 28, 2001

(65) Prior Publication Data

US 2002/0040285 A1 Apr. 4, 2002

Related U.S. Application Data

(63) Continuation-in-part of application No. 09/406,016, filed on Sep. 24, 1999, now Pat. No. 6,594,803.

(60) Provisional application No. 60/302,593, filed on Jul. 2, 2001.

(51) Int. Cl.
*G06F 17/50* (2006.01)
*G06F 9/45* (2006.01)
*G06G 7/34* (2006.01)

(52) U.S. Cl. .................. 703/17; 716/4; 716/5
(58) Field of Classification Search .......... 703/17; 716/18, 4, 5
See application file for complete search history.

(56) References Cited

U.S. PATENT DOCUMENTS

| | | | |
|---|---|---|---|
| 4,555,771 A | 11/1985 | Hayashi | |
| 4,665,537 A | 5/1987 | Moriyama | 714/755 |
| 4,787,057 A | 11/1988 | Hammond | 708/607 |
| 5,450,568 A | 9/1995 | Saji | 716/20 |
| 5,550,765 A | 8/1996 | Bhattacharya | 708/401 |
| 5,740,284 A | 4/1998 | Wober | 382/250 |
| 5,742,795 A | 4/1998 | Hammond | 703/2 |
| 5,764,993 A | 6/1998 | Shindo | 717/160 |
| 5,983,230 A | 11/1999 | Gilbert | 707/101 |
| 6,016,395 A | 1/2000 | Mohamed | 717/149 |
| 6,069,497 A | 5/2000 | Blomgren | 326/105 |
| 6,118,304 A | 9/2000 | Potter | 326/93 |
| 6,141,673 A | 10/2000 | Thayer | 708/402 |
| 6,336,209 B1 * | 1/2002 | Nishihara et al. | 716/17 |

(Continued)

OTHER PUBLICATIONS

Boehm et al., "Parts Renewal in Continuous-Time Monte Carlo Reliability Simulation" 1988 Proceedings Annual Reliability and Maintainability Symposium. p. 345-349.*

*Primary Examiner*—Paul L. Rodriguez
*Assistant Examiner*—Tom Stevens
(74) *Attorney, Agent, or Firm*—Matthew J. Booth; Matthew J. Booth & Associates PLLC (57) ABSTRACT

The disclosed invention is a grid that monitors a design simulation to support design verification coverage analysis. The disclosed invention includes n ordered axis declarations 72 that each correspond to a functional attribute and list at least two valid functional states, logic expressions 78 that test for the functional states and set axis variables, and a grid declaration 80 that converts the axis variables to a unique linear index value corresponding to the cross-product of the achieved functional states and records hits. The linear index is calculated by multiplying the integer value of each axis variable (except the nth axis variable) by the product of the sizes of each higher-order axis than the axis to which said axis variable corresponds, summing the results, and adding the integer value of the nth said axis variable.

11 Claims, 4 Drawing Sheets

U.S. PATENT DOCUMENTS

| | | | |
|---|---|---|---|
| 6,345,381 B1 * | 2/2002 | Leight et al. | 716/18 |
| 6,574,788 B1 * | 6/2003 | Levine et al. | 716/18 |
| 6,594,803 B1 * | 7/2003 | Weber et al. | 716/5 |
| 6,604,065 B1 | 8/2003 | Blomgren | 703/15 |
| RE38,365 E | 12/2003 | Shindo | 717/160 |
| 6,785,730 B1 | 8/2004 | Taylor | 709/230 |
| 6,889,180 B1 * | 5/2005 | Weber et al. | 703/16 |
| 2002/0091800 A1 | 7/2002 | Wilkinson | 709/219 |
| 2003/0009748 A1 | 1/2003 | Glanville | 717/140 |
| 2003/0122584 A1 | 7/2003 | Boehm | 326/105 |

* cited by examiner

GRID THAT TRACKS THE OCCURRENCE OF A N-DIMENSIONAL MATRIX OF COMBINATORIAL EVENTS IN A SIMULATION USING A LINEAR INDEX

This application claims the benefits of the earlier filed U.S. Provisional Application Ser. No. 60/302,593, filed Jul. 2, 2001 (02.07.2001), which is incorporated by reference for all purposes into this specification.

Additionally, this application is a continuation-in-part of U.S. patent application Ser. No. 09/406,016, filed 24 Sep. 1999 (24.09.1999), now U.S. Pat No. 6,594,803 entitled "Method and Apparatus that Reports Multiple Status Events with a Single Monitor", which is incorporated by reference for all purposes into this specification and referred to herein as "the Grid Patent."

CROSS REFERENCE TO RELATED APPLICATIONS

This application is related to U.S. patent application Ser. No. 09/406,017, filed 24 Sep. 1999 (24.09.1999), entitled "Method and Apparatus for a Monitor that Detects and Reports a Status Event to a Database", which is incorporated by reference for all purposes into this specification and referred to herein as "the Monitor Patent."

BACKGROUND OF THE INVENTION

1. Field of the Invention

The present invention relates to design verification in the digital computing field. More particularly, the present invention relates to a coverage analysis tool and method that monitors a simulation test on a digital design to detect and report interesting events and states achieved during the simulation.

2. Description of the Related Art

A digital design performs a finite number of logical functions or operations. For instance, a typical digital design such as a microprocessor might support four separate operations called addition (a), multiplication (m), subtraction (s), and division (d). Within each operation, different specific events may occur. For instance, addition of two negative numbers may occur, or addition of two positive numbers may occur.

A digital design will support many combinations of events where each type of specific event is called a state. In more complex designs, events may happen serially so that the number of states is increased. For instance, the operation sequence addition-multiplication-division (amd) is a different state than the operation sequence addition-multiplication-subtraction (ams). More states exist in the digital design when each a, m, s, and d operation supports various types of operands (i.e., positive, negative, and zero). Each permutation combining possible specific events results in a different state.

Exhaustive verification of modern digital designs such as microprocessors is virtually impossible because such designs may attain an almost incalculable number of states. A designer must therefore determine a sub-list of states that represent the most interesting states. The sub-list of states should include functional events, which are events that can be defined based on the specification of the design, and implementation events, which are specific to how the designer chose to implement the specification. While the sub-list of interesting states is not exhaustive, it usually provides a yardstick for measuring test coverage. To gain an adequate level of confidence that the design is functioning correctly, it is necessary to verify whether the design attains all of these interesting states during operation or simulation.

Verification of digital designs is usually done using a simulator. A simulator is a program that runs the design file of a digital design in order to recreate how the design would perform on a computer chip. A common method for generating test stimulus is to use a random, or directed random, test case generator. With random test case generation, the correctness of the design being simulated is established by having the results predicted automatically by some sort of reference model. The actual checking may take many forms, ranging from comparing the final results in memory to checking internal state cycle-by-cycle. There are major advantages to using random test case generation. Computer programs can generate test cases much faster than people can, so many more design states can be reached in the same amount of time using random test case generation. This is critically important for complex designs which need a reasonable time-to-market. Also, by introducing randomness, the verification engineer can think of a general set of tests that would hit interesting states, and let the computer generate all the special cases. In many cases, the random test generator ends up creating situations that a tester may not have thought to create.

One drawback to random test case generation is that it is difficult to know exactly what is being tested. Consequently, it is difficult to gain an adequate level of confidence that the design is attaining all of the required states determined by the designer to be interesting. A number of approaches have been used to determine when a design has been sufficiently verified using random test case generation. One method is to use statistical data from previous designs to predict the expected bug rate. This requires that the statistical data exist for the same style of design and the same test generation tool. Another method is to simply try as many different test strategies with the random test generator as one can think of, and then run them until the bug rate decreases. A third method is to use coverage analysis tools to quantify the percentage of the existing design states that have been hit.

Existing coverage analysis tools typically traverse the source code of the design to generate a list of unique states to be tracked. Since the resulting coverage data is based purely on the existing source code, the coverage data is very specific to the implementation of the design. There is no way to use the coverage data to evaluate functional coverage, or how much of the specification that details the functional requirements of the design has been tested. It can also be difficult to evaluate how many of the cases that have not been hit are actually interesting. And finally, current source-code generated coverage tools do not generate and track interesting combinations of states, so source-code generated data does not include data on interesting combinations of events.

The present invention introduces a method for evaluating coverage from either a functional or an implementation perspective, including combinatorial coverage. It provides an easy way to write a software monitor to identify an event or state in a design simulation and then log the information concerning attainment of the state into a database for further analysis. Designers can then analyze the database to determine if the simulation provides adequate coverage of a particular list of interesting events. If the simulation does not adequately cover certain events, the cause can then be investigated. The list of events monitored and reported into the database can be driven by the sub-list of events determined by the designer to be interesting.

One way that designers identify interesting combinatorial events is to take the cross product of two or more events. For example, designers typically want to verify design functionality for every possible combination of two back-to-back instructions. Likewise, designers will likely want to test all possible combinations of operands for an instruction. As designs become more complex and capable of executing more unique instructions with more types of operands, more interesting states can be expressed as a cross product of different events.

The assignee of the present invention, Intrinsity, Inc., has developed and patented a new logic design style called N-NARY Dynamic Logic ("NDL"). A new logic design style requires new coding techniques to verify the computer-aided design of the logic circuits and their constituent subcircuits, and NDL is no exception. NDL is a dynamic logic design style fully described in U.S. Pat. No. 6,069,49, titled "Method and Apparatus for a N-NARY Logic Circuit Using 1-of-N Signals", which is incorporated by reference for all purposes and is referred to herein as "The N-NARY Patent." NDL uses a multiphase clock scheme that self-synchronizes the logic flow, thus eliminating the need for static latches and registers and elaborate timing schemes. NDL synchronization is further described in detail in U.S. Pat. No. 6,118,304, entitled "Method and Apparatus for Logic Synchronization," which is incorporated for all purposes and referred to herein as "the Logic Synchronization Patent."

The simulation of NDL is fully described in the following copending patent applications: U.S. patent application Ser. No. 09/405,618, filed 24 Sep. 1999 (24.09.1999), titled "Software Modeling of Logic Signals Capable of Holding More Than Two Values", and U.S. patent application Ser. No. 09/405,474, filed 24 Sep. 1999 (24.09.1999), titled "Four-State Simulation for Non-Binary Logic", both of which are incorporated by reference for all purposes.

As described in further detail in the N-NARY patent, the N-NARY logic family supports a variety of signal encodings, including 1-of-4. In 1-of-4 encoding, four wires are used to indicate one of four possible values. In contrast, traditional static logic design uses two wires to indicate four values, as is demonstrated in Table 1. In Table 1, the $A_0$ and $A_1$ wires are used to indicate the four possible values for operand A: 00, 01, 10, and 11. Table 1 also shows the decimal value of an encoded 1-of-4 signal corresponding to the two-bit operand value, and the methodology by which the value is encoded using four wires.

TABLE 1

| 2-bit operand value | | N-NARY (1-of-4) Signal A Decimal Value | N-NARY (1-of-4) Signal A 1-of-4 wires asserted | | | |
|---|---|---|---|---|---|---|
| $A_1$ | $A_0$ | A | A[3] | A[2] | A[1] | A[0] |
| 0 | 0 | 0 | 0 | 0 | 0 | 1 |
| 0 | 1 | 1 | 0 | 0 | 1 | 0 |
| 1 | 0 | 2 | 0 | 1 | 0 | 0 |
| 1 | 1 | 3 | 1 | 0 | 0 | 0 |

While "traditional" dual-rail dynamic logic also uses four wires to represent two bits, the dual-rail scheme always requires two wires to be asserted, whereas NDL only requires assertion of one wire, thus reducing power and signal noise. Other benefits of NDL over dual-rail dynamic logic are described in the N-NARY Patent. All signals in NDL, including 1-of-4, are of the 1-of-N form where N is any integer greater than one. More than one wire will never be asserted for a valid 1-of-N signal. Similarly, NDL requires that a high voltage be asserted on only one wire for all values, even the value for zero (0).

Any one NDL gate may comprise multiple inputs and/or outputs. In such a case, a variety of different N-NARY encodings may be employed. For instance, consider a gate that comprises two inputs and two outputs, where the inputs are a 1-of-4 signal and a 1-of-2 signal and the outputs comprise a 1-of-4 signal and a 1-of-3 signal. Variables such as P, Q, R, and S may be used to describe the encoding for these inputs and outputs. One may say that one input comprises 1-of-P encoding and the other comprises 1-of-Q encoding, wherein P equals two and Q equals four. Similarly, the variables R and S may be used to describe the outputs. One might say that one output comprises 1-of-R encoding and the other output comprises 1-of-S encoding, wherein R equals four and S equals 3. Through the use of these, and other, additional variables, it is possible to describe multiple 1-of-N signals used in NDL gates that comprise a variety of different encodings.

1-of-N signals used in NDL gates are named according to a signal naming convention that is fully described in a copending patent application, U.S. patent application Ser. No. 09/210,408, titled "Method and Apparatus for N-NARY Hardware Description Language", which is incorporated by reference for all purposes and is referred to herein as "The Hardware Description Patent." The signal naming convention identifies certain information that characterizes the signal, specifically information concerning 1-of-N degree, evaluation, and clock phase. For further details regarding the meaning and interpretation of the various fields in a signal name, the reader is encouraged to refer to the Hardware Description Patent. A typical name for a typical 1-of-N signal might be "disp_valid_4H2", which indicates a 1-of-4 signal described as "disp_valid" th evaluates on the rising edge of the second clock phase. The present invention refers to signals using the signal naming convention as described in the Hardware Description Patent.

SUMMARY OF THE INVENTION

The present invention comprises a method and apparatus that monitors the simulation of a digital design such as a processor, and detects and reports certain events and combinations of events to a database. Conceptually, the monitor first constructs an n-dimensional array wherein each array entry corresponds to a processor state comprising the cross product of multiple specific verification events determined by the designer to be a combination of events of interest. The monitor then monitors the simulation, and counts the number of times each state corresponding to each array entry is encountered. The monitor, also referred to as a grid in this description, runs in parallel with the simulation, and if the grid detects a specified event that is an entry in the n-dimensional array, it logs the information and reports the information to a database.

The grid includes a monitor declaration that provides a unique name for the grid, n ordered axis declarations, wherein n is at least 1, that name a first through a nth axis, one or more logic expressions, and a grid declaration. Each axis declaration corresponds to a functional attribute of the design and lists two or more functional states of the functional attribute. The size of each axis comprises the number of functional states listed in its axis declaration. The logic expressions evaluate whether the design has achieved one of the functional states along each axis, and if a logic expression relating to an axis evaluates true, it sets the axis variable for that axis to the integer value corresponding to the functional state found. If all n axis variables are set to valid values during the evaluation of the logic expressions, the grid declaration converts the n axis variables to a unique linear index value that corresponds to the cross-product of the functional states achieved by the design, and records hits at each unique linear index value determined. The grid declaration can maintain a hit map indexed to the unique linear index for later downloading to a database.

The grid calculates the unique linear index value by multiplying the integer value of each axis variable (except the nth axis variable) by the product of the sizes of each higher-order axis than the axis to which said axis variable corresponds, summing the results, and adding the integer value of the nth said axis variable.

The grid also includes a parser that translates the grid into a computer program comprising a standard higher-order software language such as C++. In some embodiments, the parser further translates each unique linear index value to a character string comprising a concatenation of character strings that correlate to the monitor name and to each functional state within the cross-product of functional states achieved by the design. The hit map can be reported to the database in either the linear index format or the character string format. The present invention further comprises embodiments where a grid uses either a fully populated state array, wherein all permutations of valid states for each axis are included, or a sparsely populated state array, wherein only permutations of the valid states of each axis that are of interest to the designer are included.

DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention is a method and apparatus that monitors the simulation of a digital design such as a processor, and detects and reports certain events and combinations of events to a database. This disclosure describes numerous specific details that include specific software structures and example instruction streams in order to provide a thorough understanding of the present invention. One skilled in the art will appreciate that one may practice the present invention without these specific details.

In the embodiment described herein, the present invention is implemented in a monitor language described in detail in the Monitor and Grid Patents. That description is not repeated here, and readers interested in the particulars of the monitor language are encouraged to refer to the Monitor and Grid Patents for the specific information they seek. As described in the Monitor and Grid Patents, the monitor language provides a straightforward method for a user to create a software monitor that is easily converted by a parser into a standard higher-order software language such as the C++ language. C++ is a compiled language, that is, C++ programs are written in a human-readable script and this script is then provided to another program called a compiler, which generates a machine-readable numeric code that can be loaded into, and directly executed by, a computer. Those skilled in the art are very familiar with C++, and many articles and texts are available which describe the language in detail. The exemplary embodiment detailed herein is described using a monitor language that uses existing C++ constructs as an initial foundation, and adds a set of statements using keywords that are translated by a parser into multiple C++ routines and functions, which are then compiled for execution by the simulator. However, those skilled in the art will understand that monitors and grids can be developed in other higher-order object-oriented programming languages (such as Java) or modified versions of those languages, without departing from the present invention. Similarly, those skilled in the art will understand that the parser of the present invention can be modified to translate a monitor or grid written in the monitor language described in the Monitor and Grid Patents into a programming or computer language other than C++, without departing from the present invention.

As described in more detail in the Monitor and Grid Patents, monitors and grids are used to evaluate the completeness of the simulation of a digital design such as a processor. More specifically, a monitor checks a design under simulation for specific verification events. If the monitor detects a specific event, it reports the information to a database. As described in the Grid Patent, a grid is a monitor that detects a cross product of verification events and reports each cross product as a single status event to a database. Both patents describe the monitor language used to create software monitors and grids that may be translated into a standard computer language by a parser.

Figure 1:
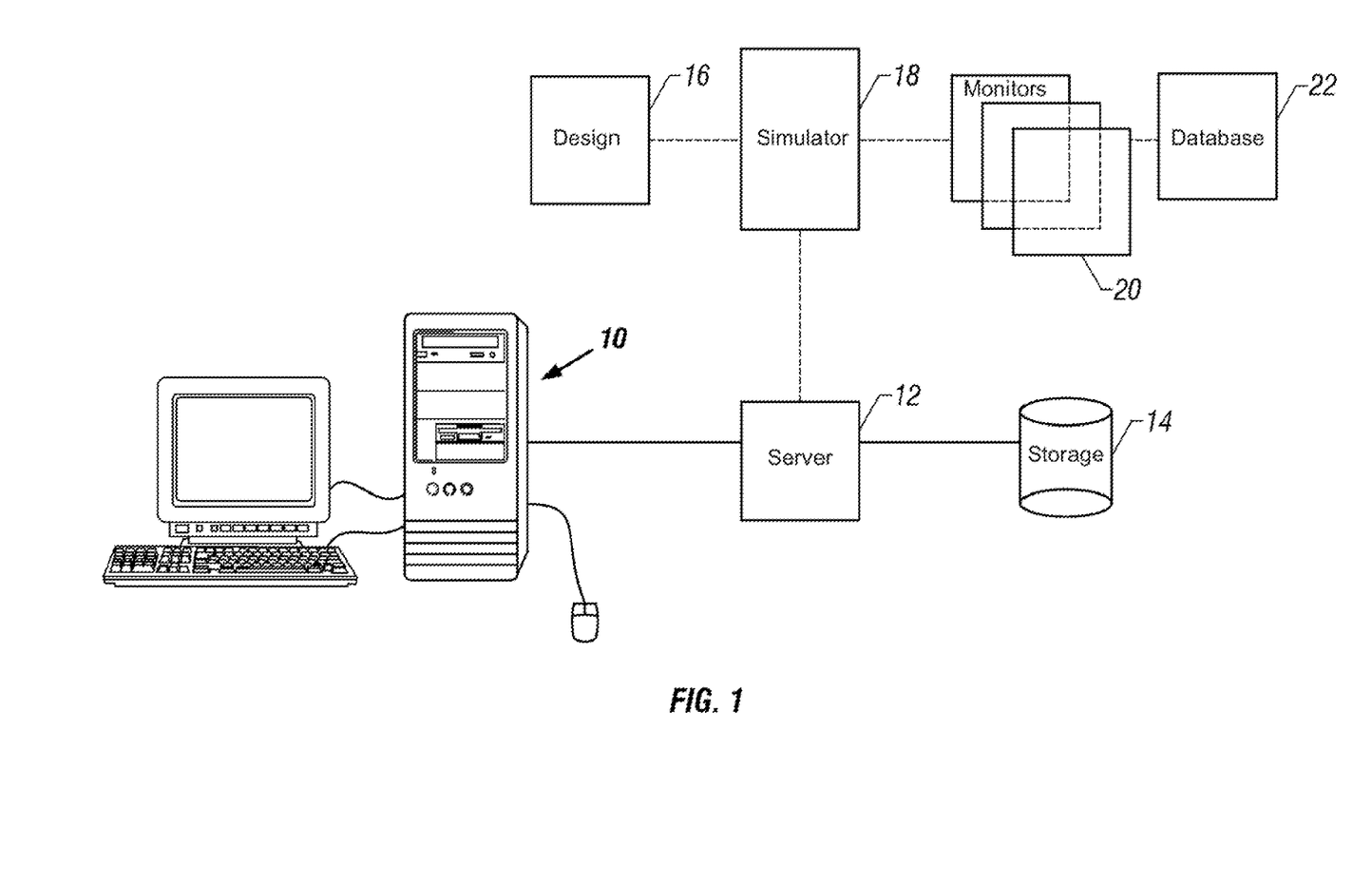
FIG. 1 is a system level description of the present invention.

FIG. 1 illustrates the present invention at a system level. A user at a workstation 10 runs a simulation. A workstation 10 is coupled to a server 12, which is in turn coupled to a shared storage device 14. A server 12 provides the facilities with which to run the simulation. When the simulation is run, one or more monitors and/or grids 20 run together with the simulator 18 and check the design 16 for a particular specified state. An individual monitor 20 detects and reports a status event to a database 22. An individual grid 20 detects a cross product of verification events and reports each cross product as a single status event to the database 22.

Monitors

Figure 2:
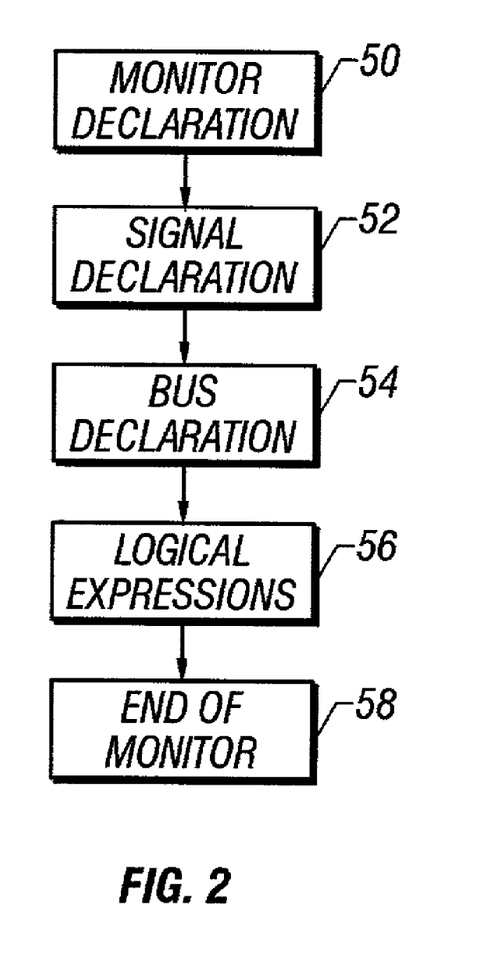
FIG. 2 illustrates the general organization of an example monitor.

FIG. 2 and Table 2 illustrate an example monitor that is described in more detail in the Monitor Patent. The monitor comprises a monitor declaration 50, zero or more signal declarations 52, zero or more bus declarations 54, and one or more logic expressions 56.

TABLE 2

```
monitor (ADD) {                                    // monitor declaration
signal *val = "disp_valid_2h1";                    // signal declaration
bus op = "disp_opcode_B[5:0,2]_4h1";               // bus declaration
if ((*val == V1) && (bus_val(op) == 0x18)) return true;  // logic expression
}                                                  // end of monitor
```

As described in the Monitor Patent, the monitor declaration defines the unique name of the monitor; the signal declaration defines a variable name local to the monitor which is a pointer to a signal in the design; the bus declaration defines the name of a bus, which is a set of signals used to represent a single value; and the logic expression specifies the event that the monitor is evaluating using the signal and bus values as operands in an expression that uses logical operators and can be evaluated as true or false. When the event specified by the logic expression has occurred and the logic expression evaluates true, the monitor returns a true value.

To use the monitor in a simulation, the monitor code is translated by a parser into a software routine such as a C++ function. The software routine is then compiled and dynamically or statically linked into the simulation environment, which includes software that evaluates each monitor during every simulation cycle and tracks how many times each monitor evaluates to true during a simulation. At the end of the simulation, the simulation environment summarizes this coverage information and logs it in a database for future analysis. This approach to writing and using monitors provides an easy way to define functional verification events or design state events, provides an automated method to compile and link the code into the simulation, and provides an automated method to report the coverage results to a database.

Grids

The monitor described above provides an easy way to track the occurrence of individual states or events within a simulation. Moreover, at any given time during a single simulation, multiple monitors can be running to track multiple events. A designer interested in ascertaining whether a certain interesting combination of events has occurred during a simulation could create the monitors to detect each event, and then analyze the database to determine whether each of the relevant monitors recorded a hit during the proper time frame.

Figure 3:
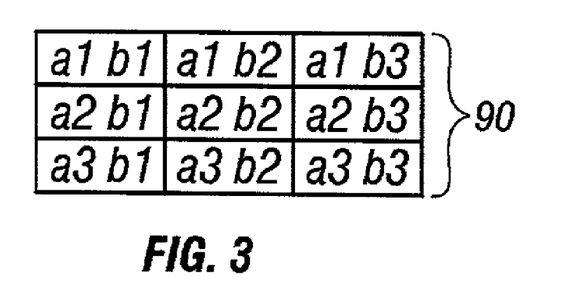
FIG. 3 is a diagram illustrating a cross product of events for a grid comprising a fully populated state array.

However, a more efficient way to detect and record the occurrence of interesting combinations of events is to create a single grid that covers all of the events, rather than multiple monitors that each cover one of the events. A grid is essentially a monitor that is capable of detecting combinations of interesting events and reporting a single hit to the database that corresponds to the event combination. Combinations of events in the test coverage of a digital design can be described as a "cross product" of some number of events. For example, one may want to test a digital design such as a processor for all combinations of two instructions running back-to-back. Likewise, designers may want to test all possible combinations of external bus accesses. FIG. 3 is a diagram illustrating an array of interesting test events wherein each cell is an event represented by a different cross product of the possible functional states (1, 2, and 3) of two different functional attributes (a and b) under test.

Examples of functional attributes that might be tested include op codes (functional instructions like add, subtract, or multiply and the like, or a register instruction like load, store, and the like), cache states (e.g., a dirty miss, a clean miss, a clean hit, a dirty hit, or a non-cacheable state), bus access states (e.g., a simple request, a snoop, an invalidate, an emulation access, and block reads and writes); access sizes (e.g., 1 Kbyte accesses, 2 Kbyte accesses, 4 Kbyte accesses, etc. ) and address states (e.g., boundary crossings or unaligned addresses). Each functional attribute has two or more possible functional states.

Returning to FIG. 3, a designer might wish to test for the combination of an add instruction followed by a subtract instruction wherein each instruction has an operand that is either positive, zero, or negative. In this example, attribute a might be the add instruction having functional states positive operand (1), zero (2), and negative operand (3). Similarly, attribute b might be the subtract instruction having functional states positive operand (1), zero (2), and negative operand (3). FIG. 3 shows the fully populated cross product of events wherein a1b1 represents the state where the instructions are run back-to-back and both have a positive operand; a1b2 represents the state where the instructions are run back-to-back and the add instruction has a positive operand while the subtract instruction includes a zero; a1b3 represents the state where the instructions are run back-to-back and the add instruction has a positive operand while the subtract instruction has a negative operand, and so forth. Note that all cells of FIG. 3 are occupied, indicating a fully populated state array or cross product of events. The Grid Patent describes how grids can be written that result in a sparsely populated state array or cross product of events, which might be more appropriate in certain situations (e.g., when testing two or more functional attributes wherein each has valid states that either cannot be validly combined or result in uninteresting combinations.) The present invention functions using either a fully populated state array or a sparsely populated state array. For clarity, the following description and examples assume a fully populated state array, however, those skilled in the art will recognize that any of the examples herein could be modified to produce a sparsely populated matrix using the grid_register and for_each keywords and methodologies discussed in detail in the Grid Patent.

Figure 4:
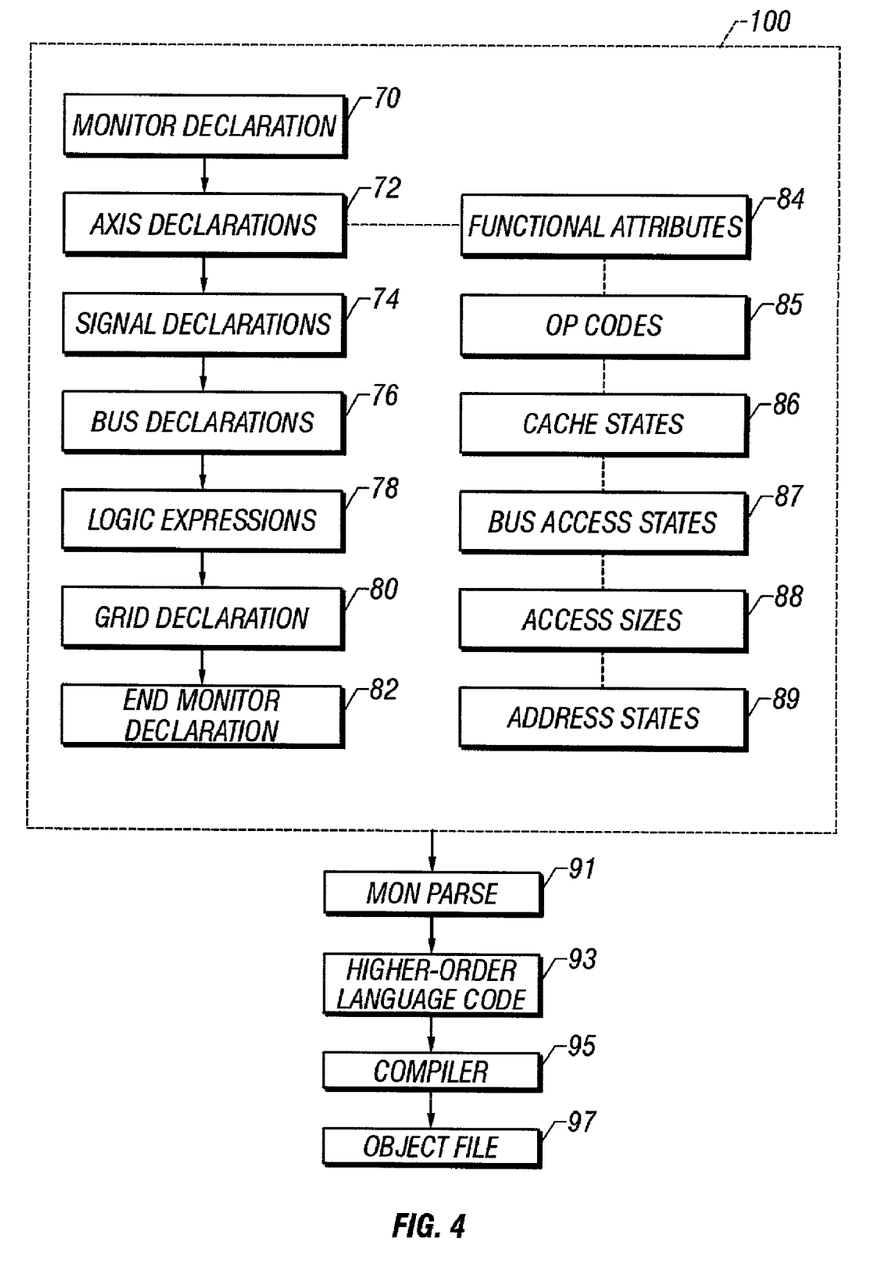
FIG. 4 illustrates the general organization of the present invention.

As described in the Grid Patent, a grid is defined as a monitor that detects a cross product of multiple status verification events and reports a single status event to a database. A grid 100, as illustrated in FIG. 4, comprises source code that includes a monitor declaration 70, one or more axis declarations 72, zero or more signal declarations 74, zero or more bus declarations 76, one or more logic expressions 78, and a grid declaration 80. The monitor declaration 70, signal declaration 74, bus declaration 76, and logic expressions 78 in a grid 100 are identical to the monitor declaration 50, signal declaration 52, bus declaration 54, and logical expressions 58 described above in connection with FIG. 2 and Table 2. However, as shown in FIG. 4, a grid 100 also includes one or more axis declarations 72. The axis declarations are used to produce an array such as that shown in FIG. 3 wherein each entry comprises the cross product of interesting verification events. The grid declaration 80 returns the status event.

Each individual axis declaration comprises two or more possible functional states of a functional attribute 84 under test. FIG. 4 shows several possible functional attributes 84 that might be suitable as grid axes: op codes 85, cache states 86, bus access states 87, access sizes 88, and address states 89. Those skilled in the art will understand that the functional attributes that might yield interesting grids that are shown and described herein are for illustration only and are not intended to convey any limitation of the present invention.

As shown in FIG. 4, the grid source code 100 is parsed by a parser 91, which produces a higher-order language computer program 93, which is then compiled by a compiler 95 into object code 97 that runs concurrently with the design simulation as described in connection with FIG. 1.

Returning to the grid source code and its constituent elements, the grid axes are declared in axis declarations 72 that use the axis keyword and list the enumerated states for all the cases for that axis. Table 3 below shows the axis declarations for a grid that monitors and records the states that result from an op code that is either an add or subtract instruction having 2 operands, wherein each operand is either negative, zero, or positive. The cross product will be 2 (add/subtract)×3 (operand1: +, −,0)×3 (operand2: +,−,0) =18 combinations. Axis(0) represents the instruction type; Axis(1) represents the first operand possibilities, and Axis(2) represents the second operand possibilities.

TABLE 3 axis(0) = ADD, SUB;
axis(1) = NEG1, ZERO1, POS1;
axis(2) = NEG2, ZERO2, POS2;

While any number of axes can be specified and in any order, once the order is determined by the axis declarations, it must be maintained throughout the grid. In other words, in this grid, once the first axis, axis(0), is declared to represent the instruction type, all other attributes of the first grid axis must relate to the instruction type. Additionally, the number of states for each axis can be different, but each axis must have at least two enumerated states. The number of enumerated states in each axis declaration dictates the size of the axis. In Table 3, the size of the first axis is 2, the size of the second axis is 3, and the size of the third axis is 3.

From the axis declarations, the parser produces higher-order software code such as C++ code that generates all possible permutations of the enumerated states along each axis to produce a matrix of combinations wherein each cell comprises a different cross-product of one enumerated state along each axis. Note that while the term "cross-product" suggests that each cell will comprise a combination of at least two states, one for each of two axes, the present invention supports one-axis monitors. Therefore, as used herein, the term "cross-product" includes the case of a one-axis monitor wherein each cell of the matrix comprises one of the possible functional states for that axis.

After the matrix of state combinations is created, the parser then creates a unique name for each cross-product that is used to track the instances during a simulation when the design achieves that cross-product of enumerated states. Consequently, rather than considering each individual enumerated state on each axis as a reportable event, the present invention considers each cross-product of enumerated states to be a single reportable event. In the embodiment described in the Grid Patent, reportable event names are formed and reportable events are tracked by taking the grid base name and concatenating all legal combinations of axis elements. For example, in a grid named ARITH_INST having the above axis declarations, the parser would create event names such as ARITH_INST.ADD_NEG1_NEG2 (corresponding to the cross product of an add instruction wherein both operands were negative), ARITH_INST.ADD_NEG1_ ZERO2 (corresponding to an add instruction wherein operand 1 is negative and operand 2 is zero), ARITH_ INST.SUB_NEG1_POS2 (corresponding to a subtract instruction wherein operand 1 is negative and operand 2 is positive) and so forth, ultimately creating all 18 possible combinations. In the Grid Patent, enumerated types are then set up for each axis and axis variables declared with values that correspond to the possible functional states specified in the axis declarations. For example, axis variable declarations that correspond to the Table 3 axis declarations are shown below in Table 4.

TABLE 4

| axis__0 instr; | // axis__0 is an enumerated type with the values ADD=0, SUB=1 |
|---|---|
| axis__1 operand_type1; | // axis__1 is an enum. type with the values NEG1=0, ZERO1=1, POS1=2 |
| axis__2 operand_type2; | |

As described in the Grid Patent and shown in FIG. 4, signal declarations 74 and bus declarations 76 follow the axis variable declarations, and are as described above in connection with FIG. 2 and Table 2. Logic expressions 78 follow that test for the conditions of interest along each axis, and if those conditions are present, the axis variables are set according to the corresponding enumerated state for that axis. In the embodiment described in the Grid Patent, once all axis variables have a legal value, the grid declaration 80 constructs a string that corresponds to a unique event name in the database. For example, continuing with the add/ subtract using two operands example from above, the following grid declaration would be used with the axis declarations and axis variable declarations shown in Tables 3 and 4 to construct a string comprising the current values of axis variables instr, operand_type1, and operand_type2:

grid_return(instr,operand_type1, operand_type2);

If the instruction is a subtract, operand 1 is negative, and operand 2 is positive, then grid_return constructs the following string: SUB_NEG1_POS2, which corresponds to a unique event name in the database, and a hit is recorded. If a complete list is not provided to grid_return, then no interesting event was detected during the simulation cycle.

One drawback to constructing multiple strings and maintaining a map that correlates strings to hits is the computational energy and space required. To improve the grid's performance and memory requirements, the present invention identifies each unique reportable event that comprises a cross product of the possible functional states of different functional attributes under test via a unique linear index that is an integer, rather than a string. In this case, the code the parser generates from grid_return does not construct a string, but instead, constructs a linear index comprising a group of unique numbers having a one-to-one correspondence with each unique reportable event in the grid. In the present invention, grid_return can maintain a map that correlates each linear index value to the number of times the grid detected the event represented by the linear index value, which can later be downloaded directly to a database and/or converted to the string-based result format described in the Grid Patent or some other format suitable for coverage evaluation.

It is very desirable to keep track of things by indices, which are both easier to manipulate and have a much smaller memory footprint than strings. The present invention comprises a grid wherein each unique reportable event is assigned a unique linear index, and the overall event hit count for the grid is determined by creating and maintaining a map that correlates hits to the linear index. The present invention is capable of detecting, recording, and reporting hits on a grid having any number of axes, wherein each axis must have at least two functional states, and can have any number of functional states.

The grid source code in the present invention is not different from the grid source code described in the Grid patent. In other words, the grid source will include a monitor declaration 70, axis declarations 72, zero or more signal declarations 74, zero or more bus declarations 76, one or more logic expressions 78, and a grid declaration 80. As described above, the axis declarations will use the axis keyword and list two or more possible enumerated states of a functional attribute 84 under test. The axis variable declarations will list the axis enumerated type variable name and set up the possible values for each axis variable. As described above, the logic expressions will test for the enumerated states along each axis, and every time a logic expression evaluates true, the corresponding axis variable is assigned the integer value that corresponds to the enumerated state within the logic expression. When all logic expressions evaluate true, a hit is detected, and grid return returns a list of axis variables that are actually integers, wherein each integer corresponds to an enumerated state along an axis.

The code generated from grid_return then applies a transformation algorithm that converts the list of integers returned as axis variables to a single integer that uniquely identifies the specific cross product of events that has been detected. The algorithm operates by first creating a numbering system based upon the grid size, wherein the number of columns or entries equals the number of axes in the grid n, and the base number of each column is determined according to the following two rules:

Place 0: always a 1's column
Place p: [size of grid axis (n–p)]*[size of place (p–1)]

Figure 5:
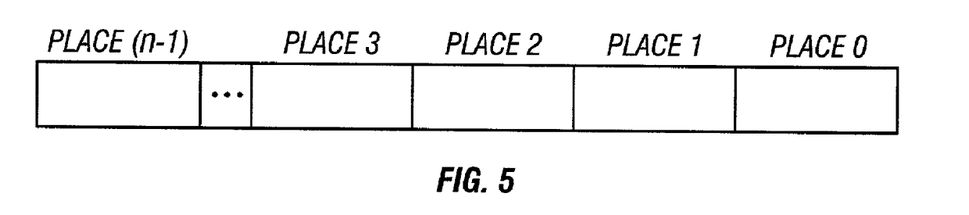
FIG. 5 shows the relative positions of each of the n columns used to transform a list of n variables having integer values to the linear index of the present invention.

FIG. 5 shows the relative positions of each of the n columns, with place 0 being the least significant column, and place n–1 being the most significant column. After the numbering system is created, the integer values of the axis variables set when the logic expressions were evaluated are then inserted in the proper order into the columns of the numbering system. Each column is then converted to a base 10 integer by multiplying the integer value of the appropriate axis variable by the base number of its corresponding column, and the column products are then summed to create a single linear index.

To illustrate the operation of the algorithm, assume a grid having the axis declarations shown below in Table 5, the axis variable declarations as shown in Table 6, and the following grid declaration:

grid_return(instr,operand_type1,operand_type2);

TABLE 5 axis(0) = ADD, SUB, MULT, DIV
axis(1) = NEG1, ZERO1, POS1;
axis(2) = NEG2, ZERO2, POS2;

TABLE 6

| | |
|---|---|
| axis_0 instr; | // axis_0 is an enumerated type with the values ADD=0, SUB=1, MULT=2, DIV=3 |
| axis_1 operand_type1; | // axis_1 is an enum. type with the values NEG1=0, ZERO1=1, POS1=2 |
| axis_2 operand_type2; | // axis_2 is an enum. type with the values NEG2=0, ZERO2=1, POS2=2 |

Figure 6A:
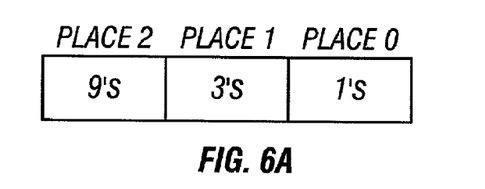
FIG. 6A shows the 3-column conversion numbering system the present invention creates for a 4×3×3 grid.

This is a 3-axis grid having 4×3×3=36 unique reportable events. FIG. 6A shows the 3-column conversion numbering system the present invention creates for this grid. According to the algorithm, there will be three digits or columns because there are three axes (n=3). Place 0, the least significant digit, is always a 1's column. The number base of place 1 is [size of grid axis (3–1)]*[size of place (1–1)]= [size of grid axis(2)]*[size of place(0)]=[3]*[1]=3. The number base of place 2 is [size of grid axis (3–2)]*[size of place (2–1)]=[size of grid axis(1)]*[size of place(1)]=[3]* [3]=9. So for this grid, the base number of the first column (leftmost column) is 9, the base number of the second column (the middle column) is 3, and the least significant column is a 1's column.

Figure 6B:
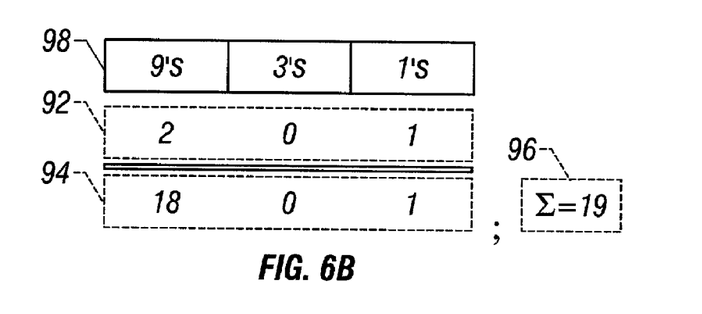
FIG. 6B shows the conversion of an example integer variable list 2, 0, 1 to its linear index value 19 for a 4×3×3 grid, according to one embodiment of the present invention.

The conversion of a hit reported as a list of axis variables that have integer values to a linear index is shown in FIG. 6B, using as an example a case where the above grid detects a hit where the operation is a multiply, the first operand is negative, and the second operand is zero. In that case, the grid would return the following list of integer variables to grid_return: 2, 0, 1. The grid_return code first creates the numbering system 98 as described above, and then inserts the list into the newly-created numbering system. As shown in FIG. 6B at 92, inserting the axis variables list into the numbering system places a "2" in the leftmost 9's column, a "0" in the middle 3's column, and a "1" in the rightmost 1's column. Each column is then converted to base 10 by multiplying the integer value by its respective base number at 94, and the three column products are summed at 96 to create the linear index value—19—that this grid associates with a multiplication instruction where the first operand is negative and the second operand is zero.

Upon closer inspection of FIGS. 6A and 6B and the two rules listed above, it is evident that another way to describe the operation of the conversion algorithm is as follows: for any list of n axis variables associated with an n-axis grid, the unique linear index is calculated by multiplying the integer value of each axis variable (except the nth axis variable) by the product of the sizes of each higher-order axis than the axis to which the axis variable corresponds, summing the results, and adding the integer value of the nth axis variable. In this specification, axis B is a "higher-order axis" than axis A if axis B is declared after axis A in the grid's axis declaration section. Using the examples from Tables 3 and 5, axis(1) and axis(2) are higher-order axes than axis(0). As compared to axis(1), axis(2) is a higher-order axis but axis(0) is not. Applying the general rule to a 3-axis grid, then, the integer value of the first axis variable will always be multiplied by the product of the sizes of axis(1) and axis(2), because the first axis variable corresponds to axis (0). The integer value of the second axis variable will always be multiplied by the size of axis(2), because the second axis variable corresponds to axis(1) and the only higher-order axis is axis(2). Finally, the integer value of the third axis variable will always be multiplied by 1, so its value is simply added to the sum of the column products.

Those skilled in the art will recognize that this conversion methodology requires that the order of the declared axes, their sizes, and the integer value of their corresponding axis variables be strictly maintained. Consequently, the n axis declarations are said to be "ordered," meaning that once the order of the axes is established by the axis declarations, the order of the axis sizes and the order of the axis variable lists is also established.

For completeness, Table 7 shows the linear index that grid_return would calculate for each reportable event in the above example grid, and Table 8 shows the full grid monitor code from which the above example was extracted.

TABLE 7

| Instr/integer value | Operand_type1/integer value | Operand_type2/integer value | index |
|---|---|---|---|
| ADD/0 | NEG1/0 | NEG2/0 | 0 |
| ADD/0 | NEG1/0 | ZERO2/1 | 1 |
| ADD/0 | NEG1/0 | POS2/2 | 2 |
| ADD/0 | ZERO1/1 | NEG2/0 | 3 |
| ADD/0 | ZERO1/1 | ZERO2/1 | 4 |
| ADD/0 | ZERO1/1 | POS2/2 | 5 |
| ADD/0 | POS1/2 | NEG2/0 | 6 |
| ADD/0 | POS1/2 | ZERO2/1 | 7 |
| ADD/0 | POS1/2 | POS2/2 | 8 |
| SUB/1 | NEG1/0 | NEG2/0 | 9 |
| SUB/1 | NEG1/0 | ZERO2/1 | 10 |
| SUB/1 | NEG1/0 | POS2/2 | 11 |
| SUB/1 | ZERO1/1 | NEG2/0 | 12 |
| SUB/1 | ZERO1/1 | ZERO2/1 | 13 |
| SUB/1 | ZERO1/1 | POS2/2 | 14 |
| SUB/1 | POS1/2 | NEG2/0 | 15 |
| SUB/1 | POS1/2 | ZERO2/1 | 16 |
| SUB/1 | POS1/2 | POS2/2 | 17 |
| MULT/2 | NEG1/0 | NEG2/0 | 18 |
| MULT/2 | NEG1/0 | ZERO2/1 | 19 |
| MULT/2 | NEG1/0 | POS2/2 | 20 |
| MULT/2 | ZERO1/1 | NEG2/0 | 21 |
| MULT/2 | ZERO1/1 | ZERO2/1 | 22 |
| MULT/2 | ZERO1/1 | POS2/2 | 23 |
| MULT/2 | POS1/2 | NEG2/0 | 24 |
| MULT/2 | POS1/2 | ZERO2/1 | 25 |
| MULT/2 | POS1/2 | POS2/2 | 26 |
| DIV/3 | NEG1/0 | NEG2/0 | 27 |
| DIV/3 | NEG1/0 | ZERO2/1 | 28 |
| DIV/3 | NEG1/0 | POS2/2 | 29 |
| DIV/3 | ZERO1/1 | NEG2/0 | 30 |
| DIV/3 | ZERO1/1 | ZERO2/1 | 31 |
| DIV/3 | ZERO1/1 | POS2/2 | 32 |
| DIV/3 | POS1/2 | NEG2/0 | 33 |
| DIV/3 | POS1/2 | ZERO2/1 | 34 |
| DIV/3 | POS1/2 | POS2/2 | 35 |

TABLE 8

```
// monitor declaration
monitor (ARITH_INST) {
// set up the axes
axis(0) = ADD, SUB, MULT, DIV;
axis(1) = NEG1, ZERO1, POS1;
axis(2) = NEG2, ZERO2, POS2;
```

TABLE 8-continued

```
// declare axis variables of each enumerated type
axis_0 instr;  // axis_0 is an enumerated type with the values ADD=0, SUB=1,
               // MULT=2, DIV=3
axis_1 operand_type1; // axis_1 is an enum. type with the values NEG1=0, ZERO1=1,
               // POS1=2
axis_2 operand_type2;
// signal declaration section
bus opcode = "disp_opcode_B[5:0,2]_4h1";
signal *operand1 = "disp_operand1_type_4h1";
signal *operand2 = "disp_operand2_type_4h1";
if (bus_val(opcode) == 0) instr = ADD;
else if (bus_val(opcode) == 1) instr = SUB;
else if (bus_val(opcode) == 2) instr = MULT;
else if (bus_val(opcode) == 3) instr = DIV;
else return false; // no interesting instructions being executed, so stop now
if (*operand1 == V0) operand_type1 = NEG1;
else if (*operand1 == V1) operand_type1 = ZERO1;
else if (*operand1 == V2) operand_type1 = POS1;
else return false;
if (*operand2 == V0) operand_type2 = NEG2;
else if (*operand2 == V1) operand_type2 = ZERO2;
else if (*operand2 == V2) operand_type2 = POS2;
else return false;
// if the monitor has not exited by this point, the values for each axis variable
// should be set to legal values, so simply do a grid_return
grid_return (instr, operand_type1, operand_type2);
}
```

MonParse

In the embodiment described in the Grid Patent, the parser translates the grid source code, written using the monitor language and keywords, to generate higher-order language software code that can then be compiled and executed. The parser of the present invention, MonParse, does the same thing, but in a slightly different manner. Whereas the parser in the Grid Patent embodiment interprets the grid_return keyword to call for a routine that constructs a string from the returned axis variables that identifies the reportable event for database logging, the parser of the present invention now interprets the grid_return keyword to call for a routine that implements the conversion algorithm described above and calculates the linear index associated with the integer variable list returned for each reportable event. In the present invention, grid_return also maintains a map that indexes hits at each reportable event to the linear index integer associated with that reportable event. At the end of the simulation, the grid can then convert each reportable event that got a hit during the simulation back into its string, and report the hit count for each string to the database. Alternatively, designers may choose to maintain the database in either the linear index format or in the axis variable list format. Regardless of which format is chosen, the present invention avoids the need to generate, maintain, and manipulate strings while the simulation is running, which frees computing resources and helps the simulation run more efficiently. In addition, those skilled in the art will understand that while the parser in this described embodiment translates the grid source code to C++, which is a standard higher-order software language, practitioners of the present invention may chose to parse the grid source code into other higher-order software languages, or indeed, into any other software or computer language of their choosing without departing from the present invention.

In connection with the parser's new functions described above, the parser of the described embodiment of the present invention creates the data structures and routines necessary to translate the integer version of the axis variable list to its unique linear index during the simulation, and back to the axis variable list at the end of the simulation. Likewise, if strings are to be used, the parser builds the data structures and routines necessary to translate from the axis variable lists that were hit during the simulation to their string equivalents for reporting to the database. Using the 3-axis ARITH_INST grid shown in Table 8 as an example, the parser of the present invention creates the following data structures from the ordered axis declarations and axis variable declarations:

```
[64] // mypCharArray is going to point to these:
     char *axis_ARITH_INST_char_0[ ] = {"add", "subtract", "multiply", "divide"};
     char *axis_ARITH_INST_char_1[ ] = {"negative", "zero", "positive"};
     char *axis_ARITH_INST_char_2[ ] = {"negative", "zero", "positive"};
[65] // pArrayEnumChar points to these:
     char**mypCharArray ARITH_INST[ ] = {
     (char**)&axis_ARITH_INST_char_0,
     (char**)&axis_ARITH_INST_char_1,
     (char**)&axis_ARITH_INST_char_2
     };
[66] // pDims points to this array
     int mypDims ARITH_INST[ ] = {
     4,         // pDims[0]
     3,         // pDims[1]
     3          // pDims[2]
     };
```

As described above, in the present invention, MonParse interprets the grid_return keyword to call for a function that converts the integer list that specifies a hit in a grid cell to a single linear index that is an integer that uniquely identifies the specific cross product of events that has been detected. Table 9 below shows a typical C++ routine that MonParse might generate to convert the integer list to the linear index, in accordance to the algorithm described above. MonParse also creates a routine that uses the data structures described above, the number of dimensions in the grid, the base name of the grid, and the linear index to recreate the name of each grid point that was hit. Table 10 below shows a typical C++ routine that MonParse might generate to convert the linear index to the concatenated strings disclosed in the Grid Patent for reporting to the database.

TABLE 9

```
// generated code related to the grid_return:
// note how the final index is calculated - each grid creates its own number
system from the number of grid axes and the size of certain axes, and the
linear index is calculated using the number system and the variables a
(integer value for axis variable instr), b (integer value for axis variable
operand_type1), and c (integer value for axis variable operand_type 2).
This code creates the linear index for the n-dimensional grid.
    void grid Return(int a,int b,int c)
    {
        IGrid Index = c;
        int IRemainingProduct = 1;
        IRemainingProduct *= pDims[2];
        IGridIndex = IGridIndex + (b * IRemainingProduct);
        IRemainingProduct *= pDims[1];
        IGridIndex = IGridIndex + (a * IRemainingProduct);
    }
```

TABLE 10

```
// This code works irrespective of the number of dimensions and the
// size of each dimension. This code takes a linear index into the
// n-dimensional grid and converts it to the string it represents. The
// string is returned in szMonName, the first argument. IIndex is the
// linear index, INumDims is the number of dimensions in the grid.
// pArrayEnumChar is the pointer to the array of strings that comprise the
// definition of the grid, pDims is a pointer to an array of integers which
// define the size of each dimension, and szMonBaseName is the base
// name of the monitor (common to all grid points represented by the
// monitor)
//----------------------------------------------------------------
void ConstructMonName(char *szMonName, int IIndex, int INumDims,
    char ***pArrayEnumChar, int *pDims, char *szMonBaseName)
{
    int *incArray = new int[INumDims];
    // we create our own number system here . . .
    incArray[INumDims – 1] = 1;
    if (INumDims > 1)
    {
        int IMultiplier = 1;
        for (int i = INumDims – 2; i >= 0; i--)
        {
            IMultiplier *= pDims[i+1];
            incArray[i] = IMultiplier;
        }
    }
    int IAmountLeft = IIndex;
    int IIncAnswer;
    sprintf(szMonName,"%s.",szMonBaseName);
    for (int j = 0; j < INumDims; j++)
    {
        // separate axes with underscore
        if (j)
            strcat(szMonName,"_");
        // look at our number system to determine if we have any of
        this index
```

TABLE 10-continued

```
        if (IAmountLeft >= incArray[j])
        {
            IIncAnswer = IAmountLeft / incArray[j];
            IAmountLeft -= IIncAnswer * incArray[j];
        }
        else
            IIncAnswer = 0;
        strcat(szMonName, pArrayEnumChar[j][IIncAnswer]);
    }
}
```

To summarize, the present invention comprises a method and apparatus that monitors the simulation of a digital design such as a processor, and detects and reports certain events and combinations of events to a database. The grid includes a monitor declaration that provides a unique name for the grid, n ordered axis declarations wherein n is at least 1 that name a first through a nth axis, one or more logic expressions, and a grid declaration. Each axis declaration corresponds to a functional attribute of the design and lists two or more functional states of the functional attribute. The size of each axis comprises the number of functional states listed in the axis declaration. The logic expressions evaluate whether the design has achieved one of the functional states along each axis, and if a logic expression relating to an axis evaluates true, it sets the axis variable for that axis to the integer value corresponding to the functional state found. If values are set for all axis variables, the grid declaration converts the n axis variables to a unique linear index value that corresponds to the cross-product of the functional states achieved by the design, and records hits at each unique linear index value determined. The grid declaration can maintain a hit map indexed to the unique linear index for later downloading to a database.

The grid calculates the unique linear index value by multiplying the integer value of each axis variable (except the nth axis variable) by the product of the sizes of each higher-order axis than the axis to which said axis variable corresponds, summing the results, and adding the integer value of the nth said axis variable.

The present invention also includes a parser that translates the grid source code into a computer program that may comprise a standard higher-order software language such as C++ or any other software or computer language desired by the user. In some embodiments, the parser further translates each unique linear index value to a character string comprising a concatenation of character strings that correlate to the grid name and to each functional state within the cross-product of functional states achieved by the design. The hit map can be reported to the database in either the linear index format or the character string format. The present invention further comprises embodiments where a grid uses either a fully populated state array, wherein all permutations of valid states for each axis are included, or a sparsely populated state array, wherein only permutations of the valid states of each axis that are of interest to the designer are included.

Other embodiments of the invention will be apparent to those skilled in the art after considering this specification or practicing the disclosed invention. The specification and examples above are exemplary only, with the true scope of the invention being indicated by the following claims.

I claim:

1. A grid that monitors a design simulation to support design verification coverage analysis, comprising:
   a monitor declaration that provides a unique name for the grid;
   n ordered axis declarations wherein n is at least 1, each said axis declaration names an axis comprising a first axis through a nth axis, wherein each said axis corresponds to a functional attribute of the design and has an axis size that comprises two or more functional states of said functional attribute and has a corresponding axis variable;
   one or more logic expressions that evaluate whether the design has achieved one or more of said functional states, said logic expressions set each one of said n axis variables to an integer value corresponding to said functional state when said logic expressions evaluate true; and
   a grid declaration that converts said n axis variables to an integer that is a unique linear index value that corresponds to the cross-product of said functional states achieved by the design, said grid declaration also records a hit at said unique linear index value.

2. A method that makes a grid that monitors a design simulation to support design verification coverage analysis, comprising:
   providing a monitor declaration that provides a unique name for the grid;
   providing n ordered axis declarations wherein n is at least 1, each said axis declaration names an axis comprising a first axis through a nth axis, wherein each said axis corresponds to a functional attribute of the design and has an axis size that comprises two or more functional states of said functional attribute and has a corresponding axis variable;
   providing one or more logic expressions that evaluate whether the design has achieved one or more of said functional states, said logic expressions set each one of said n axis variables to an integer value corresponding to said functional state when said logic expressions evaluate true; and
   providing a rid declaration that converts said n axis variables to an integer that is a unique linear index value that corresponds to the cross-product of said functional states achieved by the design, said grid declaration also records a hit at said unique linear index value.

3. A method that monitors a design simulation using a grid to support design verification coverage analysis, comprising:
   declaring a monitor in a monitor declaration that provides a unique name for the grid;
   declaring n ordered axes using axis declarations, wherein n is at least 1, each said axis declaration names an axis comprising a first axis through a nth axis, wherein each said axis corresponds to a functional attribute of the design and has an axis size that comprises two or more functional states of said functional attribute and has a corresponding axis variable;
   evaluating one or more logic expressions to determine whether the design has achieved one or more of said functional states;
   setting each one of said n axis variables to an integer value corresponding to said functional state when said logic expressions evaluate true; and
   using a grid declaration to convert said n axis variables to an integer that is a unique linear index value that corresponds to the cross-product of said functional states achieved by the design and to record a hit at said unique linear index value.

4. A program storage device readable by a machine, tangibly embodying a program of instructions executable by the machine to perform a method that monitors a design simulation using a grid to support design verification coverage analysis, comprising:
   declaring a monitor in a monitor declaration that provides a unique name for the grid;
   declaring n ordered axes using axis declarations, wherein n is at least 1, each said axis declaration names an axis comprising a first axis through a nth axis, wherein each said axis corresponds to a functional attribute of the design and has an axis size that comprises two or more functional states of said functional attribute and has a corresponding axis variable;
   evaluating one or more logic expressions to determine whether the design has achieved one or more of said functional states;
   setting each one of said n axis variables to an integer value corresponding to said functional state when said logic expressions evaluate true; and
   using a grid declaration to convert said n axis variables to an integer that is a unique linear index value that corresponds to the cross-product of said functional states achieved by the design and to record a hit at said unique linear index value.

5. A claim according to claim 1, 2, 3 or 4 wherein said grid declaration maintains a map of hits at each linear index value determined during a simulation, and downloads said map to a database.

6. A claim according to claim 1, 2, 3 or 4 wherein said unique linear index value is determined by multiplying the integer value of each said axis variable except the nth said axis variable by the product of the sizes of each higher-order axis than the axis to which said axis variable corresponds, summing the results, and adding the integer value of the nth said axis variable.

7. A claim according to claim 1, 2, 3 or 4, wherein said monitor declaration, said axis declarations, said logic expressions, and said grid declaration are translated into a computer program comprising a higher-order software language using a parser, wherein said parser further translates each said unique linear index value to a character string comprising a concatenation of character strings that correlate to said grid name and to each said functional state within said cross-product achieved by the design.

8. A grid that monitors a design simulation to support design verification coverage analysis, comprising:
   a monitor declaration that provides a unique name for the grid;
   n ordered axis declarations wherein n is at least 1, each said axis declaration names an axis comprising a first axis through a nth axis, wherein each said axis corresponds to a functional attribute of the design and has an axis size that comprises two or more functional states of said functional attribute and has a corresponding axis variable;
   one or more logic expressions that evaluate whether the design has achieved one or more of said functional states, said logic expressions set each one of said n axis variables to an integer value corresponding to said functional state when said logic expressions evaluate true;
   a grid declaration that converts said n axis variables to an integer that is a unique linear index value that corresponds to the cross-product of said functional states achieved by the design by multiplying the integer value of each said axis variable except the nth said axis variable by the product of the sizes of each higher-order axis than the axis to which said axis variable corresponds, summing the results, and adding the integer value of the nth said axis variable, said grid declaration also records a hit and maintains a map of hits at each linear index value determined during a simulation, and downloads said map to a database; and a parser that translates said monitor declaration, said axis declarations, said logic expressions, and said grid declaration into a computer program comprising a higher-order software language, said parser further translates each said unique linear index value to a character string comprising a concatenation of character strings that correlate to said grid name and to each said functional state within said cross-product achieved by the design.

9. A method that makes a grid that monitors a design simulation to support design verification coverage analysis, comprising:

providing a monitor declaration that provides a unique name for the grid;

providing n ordered axis declarations wherein n is at least 1, each said axis declaration names an axis comprising a first axis through a nth axis, wherein each said axis corresponds to a functional attribute of the design and has an axis size that comprises two or more functional states of said functional attribute and has a corresponding axis variable;

providing one or more logic expressions that evaluate whether the design has achieved one or more of said functional states, said logic expressions set each one of said n axis variables to an integer value corresponding to said functional state when said logic expressions evaluate true;

providing a grid declaration that converts said n axis variables to an integer that is a unique linear index value that corresponds to the cross-product of said functional states achieved by the design by multiplying the integer value of each said axis variable except the nth said axis variable by the product of the sizes of each higher-order axis than the axis to which said axis variable corresponds, summing the results, and adding the integer value of the nth said axis variable, said grid declaration also records a hit and maintains a map of hits at each linear index value determined during a simulation, and downloads said map to a database; and providing a parser that translates said monitor declaration, said axis declarations, said logic expressions, and said grid declaration into a computer program comprising a higher-order software language, said parser further translates each said unique linear index value to a character string comprising a concatenation of character strings that correlate to said grid name and to each said functional state within said cross-product achieved by the design.

10. A method that monitors a design simulation using a grid to support design verification coverage analysis, comprising:

declaring a monitor in a monitor declaration that provides a unique name for the grid;

declaring n ordered axes using axis declarations, wherein n is at least 1, each said axis declaration names an axis comprising a first axis through a nth axis, wherein each said axis corresponds to a functional attribute of the design and has an axis size that comprises two or more functional states of said functional attribute and has a corresponding axis variable;

evaluating one or more logic expressions to determine whether the design has achieved one or more of said functional states;

setting each one of said n axis variables to an integer value corresponding to said functional state when said logic expressions evaluate true;

using a grid declaration that converts said n axis variables to an integer that is a unique linear index value that corresponds to the cross-product of said functional states achieved by the design by multiplying the integer value of each said axis variable except the nth said axis variable by the product of the sizes of each higher-order axis than the axis to which said axis variable corresponds, summing the results, and adding the integer value of the nth said axis variable, said grid declaration also records a hit and maintains a map of hits at each linear index value determined during a simulation, and downloads said map to a database; and translating said monitor declaration, said axis declarations, said logic expressions, and said grid declaration into a computer program comprising a higher-order software language, and translating each said unique linear index value to a character string comprising a concatenation of character strings that correlate to said grid name and to each said functional state within said cross-product achieved by the design.

11. A program storage device readable by a machine, tangibly embodying a program of instructions executable by the machine to perform a method that monitors a design simulation using a grid to support design verification coverage analysis, comprising:

declaring a monitor in a monitor declaration that provides a unique name for the grid;

declaring n ordered axes using axis declarations, wherein n is at least 1, each said axis declaration names an axis comprising a first axis through a nth axis, wherein each said axis corresponds to a functional attribute of the design and has an axis size that comprises two or more functional states of said functional attribute and has a corresponding axis variable;

evaluating one or more logic expressions to determine whether the design has achieved one or more of said functional states;

setting each one of said n axis variables to an integer value corresponding to said functional state when said logic expressions evaluate true;

using a grid declaration that converts said n axis variables to an integer that is a unique linear index value that corresponds to the cross-product of said functional states achieved by the design by multiplying the integer value of each said axis variable except the nth said axis variable by the product of the sizes of each higher-order axis than the axis to which said axis variable corresponds, summing the results, and adding the integer value of the nth said axis variable, said grid declaration also records a hit and maintains a map of hits at each linear index value determined during a simulation, and downloads said map to a database; and translating said monitor declaration, said axis declarations, said logic expressions, and said grid declaration into a computer program comprising a higher-order software language, and translating each said unique linear index value to a character string comprising a concatenation of character strings that correlate to said grid name and to each said functional state within said cross-product achieved by the design.

* * * * *

UNITED STATES PATENT AND TRADEMARK OFFICE
CERTIFICATE OF CORRECTION

| | | |
|---|---|---|
| PATENT NO. | : 7,099,812 B2 | Page 1 of 1 |
| APPLICATION NO. | : 09/966049 | |
| DATED | : August 29, 2006 | |
| INVENTOR(S) | : Fritz A. Boehm | |

It is certified that error appears in the above-identified patent and that said Letters Patent is hereby corrected as shown below:

In column 4, line 36, delete "th" and insert -- that --, therefor.

Signed and Sealed this
Twenty-ninth Day of November, 2011

David J. Kappos
*Director of the United States Patent and Trademark Office*